(12) United States Patent
Isomichi et al.

(10) Patent No.: US 6,411,804 B1
(45) Date of Patent: *Jun. 25, 2002

(54) WIRELESS TERMINAL DEVICE

(75) Inventors: Yasuhiro Isomichi; Toshiyuki Tsumura; Shinichiro Inukai, all of Yokohama (JP)

(73) Assignee: Matsushita Electric Industrial Co., Ltd., Osaka (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/004,982

(22) Filed: Jan. 9, 1998

(30) Foreign Application Priority Data

Jan. 10, 1997 (JP) ............................... 9-013215

(51) Int. Cl.$^7$ ............................................ H04M 11/10
(52) U.S. Cl. .................. 455/412; 455/420; 455/70; 340/7.21; 340/7.52
(58) Field of Search ...................... 455/31.1, 88, 31.3, 455/418, 426, 31.2, 556, 412; 340/825.44; 359/109, 110

(56) References Cited

U.S. PATENT DOCUMENTS

| | | | | |
|---|---|---|---|---|
| 3,976,995 A | * | 8/1976 | Sebestyen | 340/825.44 |
| 5,440,559 A | * | 8/1995 | Gaskill | 370/314 |
| 5,754,948 A | * | 5/1998 | Metze | 455/66 |
| 5,757,277 A | * | 5/1998 | Kobayashi | 340/825.22 |
| 5,797,085 A | * | 8/1998 | Beuk et al. | 455/88 |
| 5,812,946 A | * | 9/1998 | Nakabayashi et al. | 455/426 |
| H1772 H | * | 1/1999 | Akahane | 340/825.22 |
| 5,907,418 A | * | 5/1999 | Walczak et al. | 359/142 |
| 5,930,703 A | * | 7/1999 | Cairns | 455/418 |
| 6,038,290 A | * | 3/2000 | Katada | 379/56.3 |
| 6,104,512 A | * | 8/2000 | Batey, Jr. et al. | 359/152 |

FOREIGN PATENT DOCUMENTS

JP 08009440 1/1996

* cited by examiner

Primary Examiner—Edward F. Urban
Assistant Examiner—Temica M. Davis
(74) Attorney, Agent, or Firm—Connolly Bove Lodge & Hutz LLP

(57) ABSTRACT

A pager which includes, in addition to a message receiving function, a data generation program responsive to an operation for generating and storing data in the memory; and optical communication circuit for generating and transmitting a first optical signal indicative of the message or the generated data in accordance with a data selection command to another pager and for directly receiving a second optical signal including second data from the other pager and outputting the received data; and a receiving control program for storing the received data in the memory in response to a receiving command. It may further comprise: an ID code generation program for generating a first ID code according to the data selection command; a data attaching program for attaching the ID code to the data to be transmitted to another pager. The received data is stored according to the received ID code. A light intensity changing circuit may change an intensity of the first optical signal. Moreover, it is judged whether it is possible to communicate with another pager from the received data; and the user is informed of the judging result.

7 Claims, 9 Drawing Sheets

| KIND DATA (UPPER TWO BITS) | MEANING | ADDRESS (LOWER FIVE BITS) |
|---|---|---|
| 00 | ID DATA | — |
| 01 | RECEIVED MESSAGE | NO. (1~32) |
| 10 | TEL NO. LIST DATA | NO. (1~32) |
| 11 | PREDETERMINED TXST DATA | NO. (1~32) |

WIRELESS TERMINAL DEVICE

BACKGROUND OF THE INVENTION

1. Field of the Invention

This invention relates to a pager for receiving a radio wave paging signal from a base station and a method of communication between pagers.

2. Description of the Prior Art

The pager having only a receiving function is known. Such a prior art pager notifies the user of receiving a message by sounding an alarm sound or providing vibrations to the user when the identification code assigned thereto is included in the radio wave paging signal. The pager analyzes the message signal following to the identification data and displays the content.

This prior art pager includes a memory therein for storing its ID data. This memory also stores data such as data of a telephone number list and predetermined texts prepared by the user. When the pager receives a predetermined data train of numbers as the message signal, it can display one of the predetermined texts or a telephone number corresponding to the predetermined data train. The data such as the data of the telephone number list and the predetermined texts are inputted by operating switches of the pager by the user and stored in the memory.

A system capable of reading the ID data stored in the memory of the pager and capable of simply writing the god ID data in the memory of the pager with a data input/output apparatus is proposed in Japanese patent application provisional publication No. 8-9440.

In this system, writing data in the pager from the data input/output apparatus and reading data in the data input/output apparatus from the pager are provided with an optical communication function.

FIG. 10 is a block diagram of this prior art pager. FIG. 11 is a perspective view of the prior art pager. FIG. 12 is a perspective view of the prior art data input/output apparatus capable of communicating with the prior art pager shown in FIG. 11 with the optical communication function.

The pager of this system, as shown in FIG. 10, comprises an antenna 101 for receiving a radio wave signal, a radio wave demodulation portion 102 for demodulating the received radio wave signal, a display 106 for displaying the received message on an LCD, and an alarming circuit 107 for notifying the user of the reception by an LED or a buzzer. The pager further comprises a memory 109 for storing a received message, ID data, data of a telephone number list, and predetermined text data prepared by the user, an input circuit 110 including switches for effecting turning on or off the power supply of the pager or a data input operation, an optical communication circuit 108 for receiving data to be stored in the memory 109 from the data input/output apparatus through optical communication or reading data from the memory 109 and transmitting it to the data input/output unit, and a control circuit 103 including an MPU (microprocessing unit) 104 and a control program 105 for controlling operations of respective portions of this pager.

Moreover, as shown in FIG. 11, this pager comprises, as an out line structure, switches 123 for turning on and off the power supply of the pager, a data input operation, or the like and a window 124a for optical communication.

On the other hand, the data input/output apparatus, as shown in FIG. 12, comprises a window 124b for the optical communication with the pager and an external connector 130 for exchanging data with an external unit.

In the pager of this system, the radio wave receiving circuit 102 demodulates the reception signal and sends the received message directed thereto to the control circuit 103. On receiving a message, the control circuit 103 controls the display 106 and the alarming circuit 107 to sound a melody, for example, and displays the received message, and stores the message in the memory 109.

When the data stored in the pager is read by the data input/output apparatus by converting data into an optical signal and transmitting the optical signal to the data input and output apparatus and when data is written in the pager from the data input/output apparatus, data from the data input/output apparatus is converted into another optical signal and transmitted to the pager. During transmission, the window 124a for the optical communication of the pager faces the window 124b of the data input output apparatus.

The data stored in the memory 109 of the pager is read in accordance with the control by the control portion 103, and is converted into data of the optical signal by the optical communication circuit 108 and then, is transmitted to the data input/output apparatus through the windows 124a and 124b for the optical communication. The data input/output apparatus converts the inputted optical signal into data of an electric signal and outputs it through the external connector 130.

On the other hand, the data from the data input/output apparatus is converted into another optical signal and transmitted to the pager through the windows 124a and 124b. The optical communication circuit 108 of the pager converts the optical signal into data of an electric signal and the control circuit 103 stores the converted data of the electric signal in the memory 109.

As mentioned, in this system, it is possible to simply write the data in and simply read the data from the pager using the data input/output apparatus specially provided.

SUMMARY OF THE INVENTION

The aim of the present invention is to provide an improved pager and a method of communication between pagers.

According to the present invention, a pager is provided, which comprises: a radio wave receiving circuit for receiving a radio wave paging signal including message data and address data; a memory; a microprocessor having a ROM including a message storing program for receiving the message data from the received radio wave paging signal and storing the received message data in the memory when the address data indicates the pager; and a data generation program responsive to an operation for generating data and storing the generated data in the memory; and an optical communication circuit for converting transmission data into a first optical signal and directly transmitting the first optical signal to another pager and for directly receiving a second optical signal including second data from the other pager and converting the second optical signal into received data, the ROM further including: a transmission control program for reading either of the message data or the generated data from the memory in accordance with a data selection command as the transmission data and transmitting the transmission data through the optical communication circuit in response to a transmission command and a receiving control program for storing the received data in the memory in response to a receiving command.

The ROM may further include a timing control program for controlling the transmission control program to control a timing of transmitting the transmission data.

The ROM may further include an identification code generation program for generating a first identification code in accordance with the data selection command; a data attaching program for attaching the identification code to the transmission data, the transmitting program transmitting the transmission data and the identification code, wherein the received data includes a second identification code; and a detection program for detecting the second identification code from the received data, the receiving control program storing the received data in the memory at one of storing areas in accordance with the detected second identification code.

The pager may further comprise a light intensity changing circuit for changing an intensity of the first optical signal to a high level in accordance with an intensity changing command signal.

The ROM may further include: a communication judging program for judging whether it is possible to communicate with another pager from the received data; and an informing a user of program for informing the judging result from the judging program.

In this case, the optical communication circuit may generate a test signal in response to a test signal command.

The transmitting program operates the optical communication circuit to increase the intensity of light when the transmitting program does not receive the transmission command within a predetermined interval measured by a timer.

According to the present invention, a first method of communication between pagers is provided, which comprises the steps of: receiving a radio wave paging signal including message data and address data; providing a memory; receiving the message data from the received radio wave paging signal and storing the received message data in the memory when the address data indicates the pager; generating data and storing the generated data in the memory in response to an operation; converting input data into a first optical signal and directly transmitting the first optical signal to another pager; directly receiving a second optical signal including second data from the other pager; converting the second optical signal into received data; reading either of the message data or the generated data from the memory in accordance with a data selection command indicative of either of the message data or the generated data as transmission data; transmitting the transmission data as the first optical signal in response to a transmission command; and storing the received data in the memory in response to a receiving command.

The first method may further comprise the step of: controlling a timing of transmitting the transmission data.

The first method may further comprise the steps of: generating a first identification code in accordance with the data selection command; attaching the first identification code to the transmission data; transmitting the transmission data and the first identification code, wherein the received data includes a second identification code; and the second identification code from the received data is detected; the received data is stored in the memory at one of storing areas in accordance with the detected second identification code.

The first method may further comprise the step of: changing an intensity of the first optical signal in accordance with an intensity changing command signal.

The first method may further comprise,the steps of: judging whether it is possible to communicate with another pager from the received data; and informing a user of the judging result.

According to the present invention, a second method of communication between pagers is provided, which comprise the steps of: generating transmission data in response to an operation; storing the transmission data; converting the transmission data into a first optical signal and directly transmitting the first optical signal to another of the pagers in response to a command; directly receiving a second optical signal including second data from the another pager; and storing the second data.

BRIEF DESCRIPTION OF THE DRAWINGS

The object and features of the present invention will become more readily apparent from the following detailed description taken in conjunction with the accompanying drawings in which.

The same or corresponding elements or parts are designated with like references throughout the drawings.

DETAILED DESCRIPTION OF THE INVENTION

Hereinbelow will be described a first embodiment of this invention.

Figure 1:
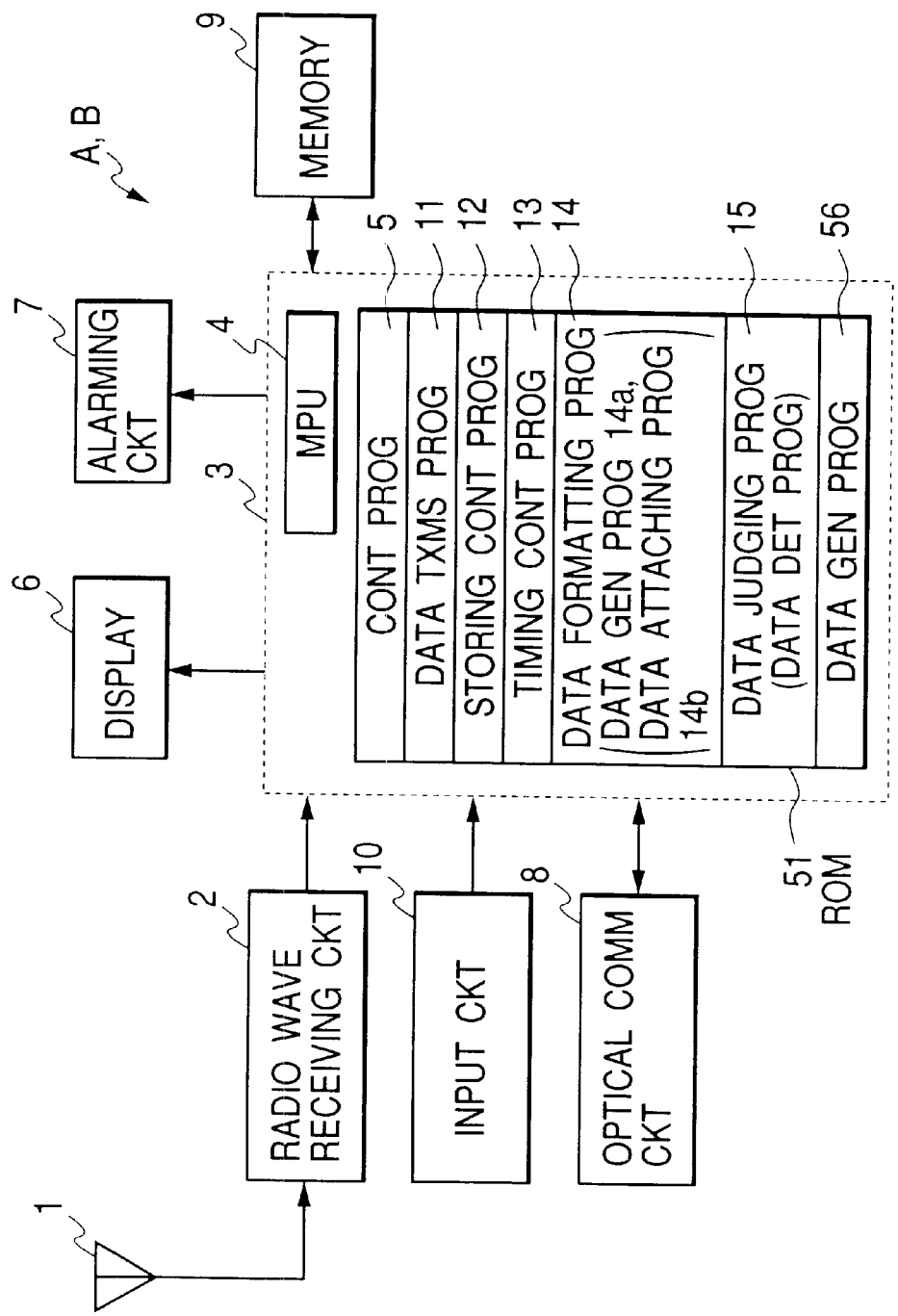
FIG. 1 is a block diagram of a pager of a first embodiment.
Figure 2:
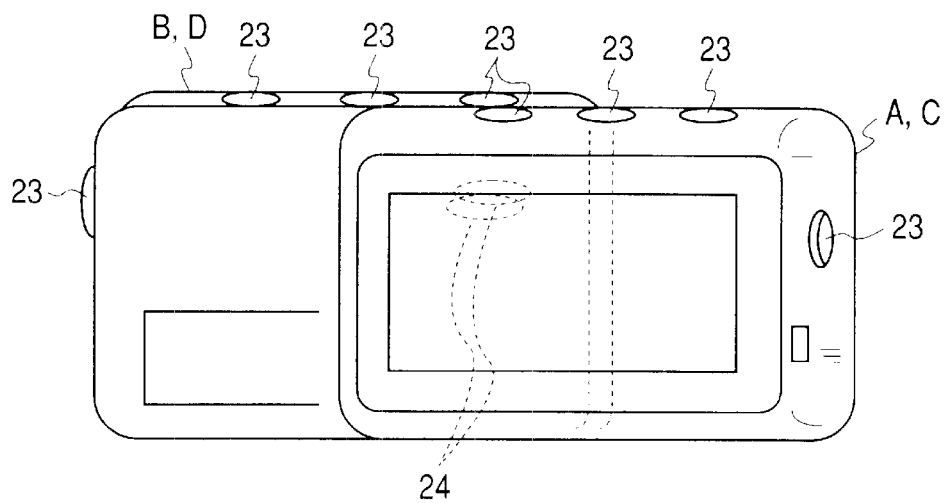
FIG. 2 is a perspective view of the pagers of first to third embodiments wherein windows of two pagers face each other.

FIG. 1 is a block diagram of a pager of the first embodiment. FIG. 2 is a perspective view of the pagers of the first embodiment wherein windows of two pagers face each other.

The pager of the first embodiment comprises an antenna 1 for receiving a radio wave paging signal, a radio wave demodulation portion 2 for demodulating the radio wave paging signal, a display 6 including an LCD (Liquid Crystal Display) for displaying the received message on the LCD, an alarming circuit 7 for alarming of the reception of a message by an LED (not shown) or a buzzer (not shown), a memory 9 for storing the received messages, an ID data (address data), telephone number list data, and predetermined texts prepared by the user, an input circuit including switches 23 for turning on or off the power supply of the pager and inputting data, an optical communication circuit 8 for converting data from the data from the control circuit 3 into a first optical signal and transmitting the first optical signal and receiving a second optical signal from another pager or a data input/output apparatus having a similar optical communication circuit and converting the received second optical signal into data to be stored in the memory 9, and a control circuit 3 including an MPU (microprocessing unit) 4 and a ROM (read only memory) 51.

The ROM 51 stores a control program 5 for controlling operations of respective portions of this pager, a data transmission control program 11 for reading data in the memory 9 in accordance with a command and transmitting the read data by the optical communication circuit 8, a storing control program 12 for determining an address of the memory 9 to store the data received from the optical communication circuit 8, and a timing control program 13 for controlling start and stop of the optical communication by the optical communication circuit 8. The ROM further stores a data formatting program 14, including an identification data generating program 14a and a data attaching program 14b, for generating an identification code in accordance with the data to be transmitted by the optical communication circuit 8 and attaching the identification code to the data to be transmitted, and a data judging program (data detection program) 15 for judging an identification code included in the received data by the optical communication circuit 8.

The memory 9 comprises a flash ROM, an EEPROM, or a RAM.

The optical communication portion 8 comprises an LED (not shown in FIGS. 1 and 2) for emitting infrared light as the optical signal and a photodiode or a phototransistor (not shown in FIGS. 1 and 2) for receiving an infrared light as the optical signal from another pager, and a window 24 for transmitting the infrared light from this pager and from another pager. The window 24 comprises a hole in the housing of the pager and a lens or a flat plate which are capable of transmitting the infrared light therethrough.

Figure 3A:
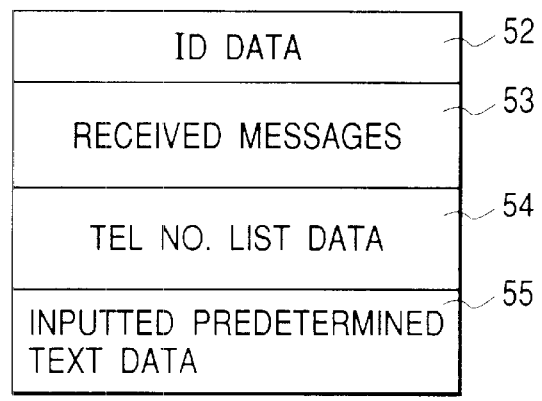
FIG. 3A shows a table of a storing area map of the memory shown in FIG. 1.
Figure 3B:
FIG. 3B is an illustration of the first embodiment showing a data format used when the data in the memory is transmitted or data is received through the optical communication.
Figure 3C:
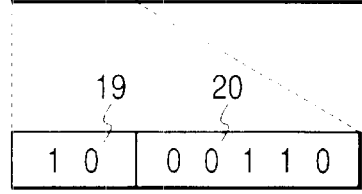
FIG. 3C is an illustration of the first embodiment showing a portion of the data format in FIG. 3B enlarged.
Figures 3D, 4:
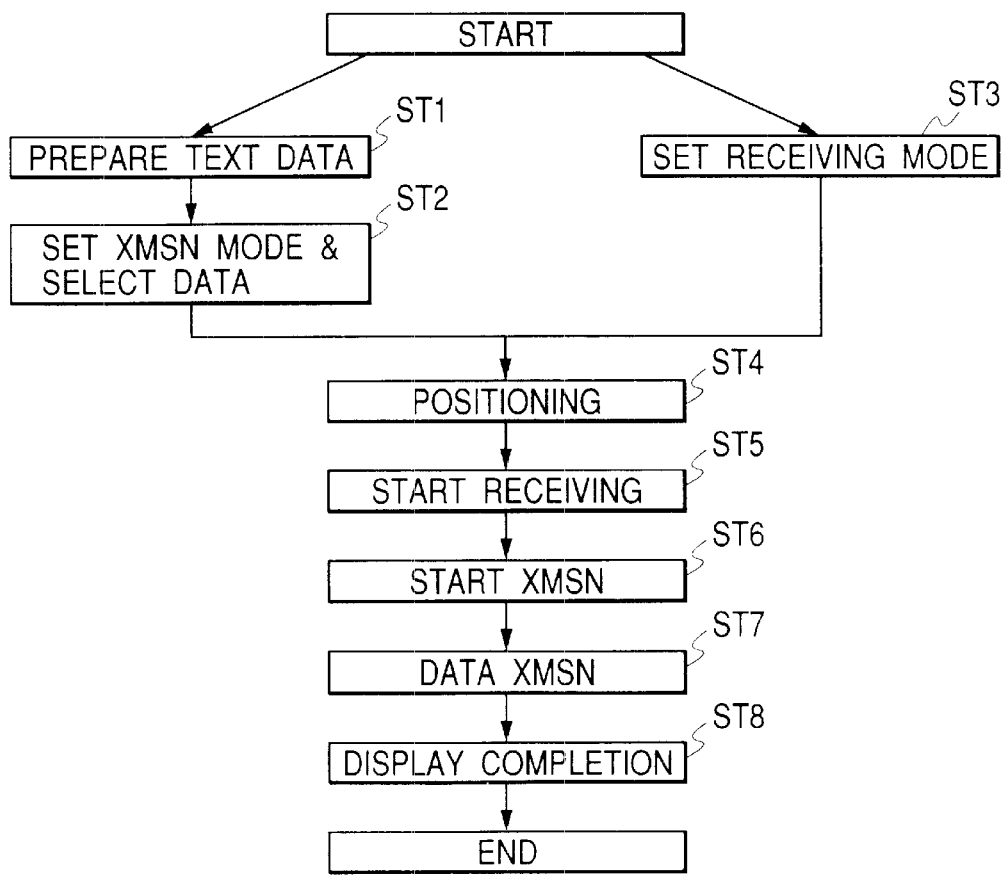
FIG. 3D is a table of the first embodiment showing an example of the identification code and address data.
FIG. 4 depicts a flow chart of the first embodiment showing an operation by the user and the pagers.

FIG. 3A shows a table of a storing area map of the memory 9. FIG. 3B is an illustration of the first embodiment showing a data format used when the data in the memory is transmitted or data is received through the optical communication. FIG. 3C is an illustration of the first embodiment showing a portion of the data format in FIG. 3B enlarged. FIG. 3D is a table of the first embodiment showing an example of the identification code and address data.

The memory 9 stores its assigned identification data at an identification data area 52, received messages at a received message area 53, a telephone number list data at a telephone number area 54, and predetermined texts inputted by the user at a predetermined text area 55.

When the data in the memory 9 is transmitted through the optical communication or when the data is received through the optical communication, the data is formed to have the data format shown in FIG. 3B. That is, in the data format 16 in FIG. 3B, seven bits of an identification code 17 is attached to the data 18 to be transmitted. More specifically, the identification code 17 is transmitted and then, the data 18 is transmitted immediately. The identification code 17 includes upper two bits of kind data 19 indicative of the kind of the data 18 and lower five bits of address data 20 of each of storing areas of the memory.

For example, the case shown in FIG. 3C represents that the data 18 to be transmitted is of the telephone number list data stored at the seventh address of the telephone number area 54. That is, because the address data 20 indicates six and the address data starts from zero, the data 18 is to be stored at the seventh address.

On the other hand, when the data is received through the optical communication, the data judging program 15 detects the identification code and judges which kind of data the received data is and supplies the judging result to the storing control program 12. The storing control program 12 stores the data in accordance with the kind data 19 and the address data 20. That is, the storing control program 12 determines one of the storing areas and determines the address in the storing area and stores the data.

The timing control program 13 controls the optical communication circuit 8 to start transmission or reception and complete the transmission or the reception.

FIG. 4 depicts a flow chart of the first embodiment showing operations by the user and the pagers.

The operation of transmitting data to another pager will be described, assuming that the user prepares the predetermined text by operating switches 23 included in the operation circuit 10, for example.

In step st1, at first, the user prepares the predetermined text data by operating the switches of the operation circuit 10 on the transmitting side of the pager A under the control of the data generation program 56 and stored in the memory 9 at the address indicated by the user using the input circuit 10.

In step st2, the user sets the pager A of the transmission side to a transmission mode and selects the data, that is, the user inputs the kind data 19 indicative of a kind of data and address 20 indicative of an address at the storing area determined in accordance the kind data, using the data transmission control program 11.

In step st3, the user operates the pager B of the receiving side to move it in the receiving mode with the input circuit 10.

In step st4, as shown in FIG. 2, the user positions the pager B such that the window 24 of the pager A faces and contacts the window 24 of the pager B to receive the infrared light surely.

In step st5, the user operates one of the switches 23 of the pager B to start receiving. In response to this, the timing control program 13 of the pager B starts receiving using the optical communication circuit 8 of the pager B.

In step st6, the user operates one of the switches 23 of the pager A to start transmitting. In response to this, the timing control program 13 of the pager A starts transmission using the optical communication circuit 8 of the pager A.

In step st7, the pager A transmits the identification code 17 and the data 18 to the pager B. The data is transmitted through the start-stop transmission method at a data rate of 2400 bps.

During the step st7, the data transmission control program 11 reads the data stored at the storing area 55 for storing the inputted predetermined texts at the eighth address in accordance with the operation of the input circuit 10. The data attaching program 14 generates the identification code 17 including the kind data "11" and address "111" and attaches the identification code 17 to the data 18 of the predetermined text data to generate transmission data having the data format 16. The transmission data is supplied to the optical communication circuit 8 of the pager A. The optical communication circuit 8 of the pager A converts the transmission data into the optical signal of infrared light and emits the optical signal toward the pager B through the window 24 of the pager A. The pager B receives the optical signal from the pager A and converts it into the electrical signal as reception data by the optical communication circuit 8 of the pager B. The data judging program 15 reads the identification code 17 from the reception data and judges the identification code 17. The storing control program 12 stores the data 18 as the reception data at the storing area 55 at the eighth address of the pager B.

In step st8, when transmission of the data has completed, the timing control programs 13 in the pagers A and B stop the operation in the optical communication circuits 8 and display "completion" on the LCDs 25 of the pagers A and B.

In this embodiment, it is possible to transmit all kinds of data stored in the memory 9. However, it is also possible to inhibit transmitting data such as the identification data assigned to each pager to another pager but to permit transmitting the identification data to the data input/output apparatus which is permitted to receive the identification data. That is, it is possible to limit the transmitting data of which security is to be kept.

In this embodiment, the number of sets of transmission data is only one. However, it is also possible to transmit a plurality of sets of transmission data at the same time. Moreover, in this embodiment, the transmission data is prepared by the user. However, it is also possible to transmit the message data received from another pager through the radio wave communication.

When an amount of the data transmitted is higher than the capacity of the memory 9 of the pager of the receiving side, it is possible to not store the overflowed data and display "partially not received" on the display 6 of the pager.

Second Embodiment

Figure 5:
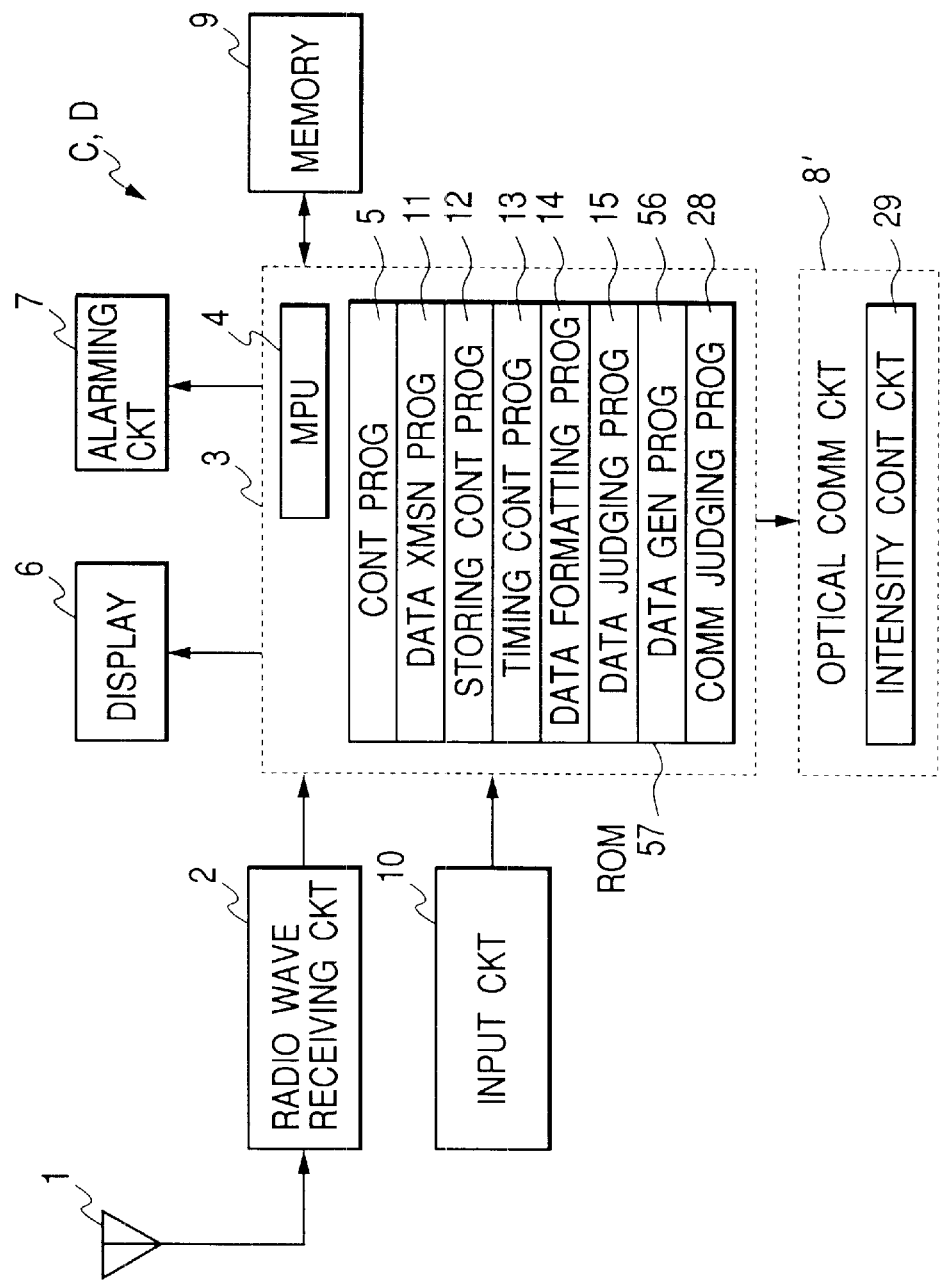
FIG. 5 is a block diagram of a pager of a second embodiment.

FIG. 5A is a block diagram of a pager of a second embodiment.

The pager of the second embodiment has substantially the same structure as that of the first embodiment. The difference is that an intensity control circuit 29 is further provided to the optical communication circuit 8, and a communication judging program 28 is further stored in the ROM.

In this embodiment, it is assumed that an intensity of the infrared light emitted by the pager C of the second embodiment toward another pager D of the second embodiment should be higher than that emitted toward an input/output apparatus having a light shielding unit for light-shielding the coupling portion between the pager C and the input/output apparatus having a similar optical communication circuit for communicating with the pager C. This is because it is difficult to provide such a light-shielding unit at the coupling portion between the pagers C and D. The inventors discovered that the intensity of the infrared light when the pager C is coupled to the input/output apparatus is suitable from 0.1 mW/cm$^2$ to 0.2 mW/cm$^2$ at the window 24 and the intensity of the infrared light when the pager C is coupled to the pager D is suitable from 5 mW/cm$^2$ to 20 mW/cm$^2$ at the window 24.

The communication judging program 28, including an informing function, judges whether it is possible to transmit the data from the pager C to another pager D or the input/output apparatus through the optical communication. If the optical communication is possible, the pager D informs the user of the possibility of the optical communication by generating an alarm sound or emitting alarming light by an LED with the alarming circuit 7. To provide this judgment, the pager C of the transmitting side emits reference infrared light toward the pager C. The communication judging program 28 of the pager D of the receiving side judges whether it is possible to transmit the data from the pager C to another pager D. If the optical communication is possible, the pager D informs the user of the possibility of the optical communication by generating the alarm sound or emitting alarming light by the LED with the alarming circuit 7 of the pager D.

In the above-mentioned example, the judgement is executed in the pager D of the receiving side. However, it is also possible to judge the possibility of the optical communication by the communication judging program 28 in the pager of the transmission side by emitting the infrared light from the pager D of the receiving side and receiving the infrared light by the pager C of the transmission side.

Figure 6:
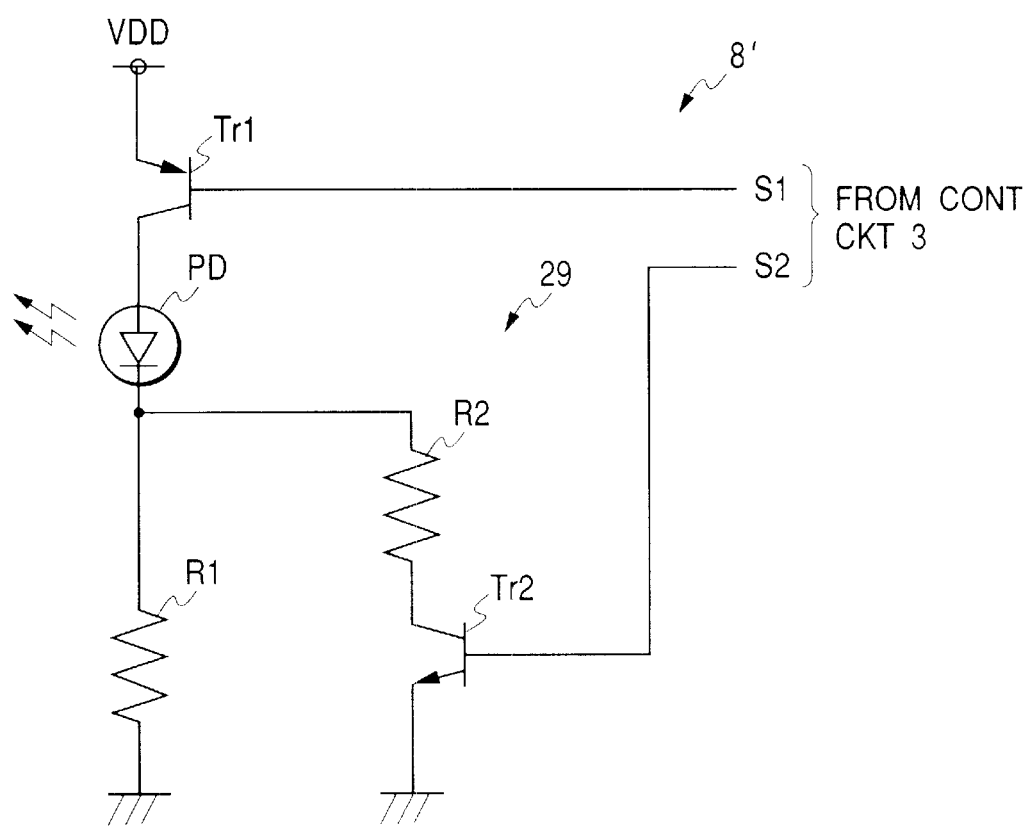
FIG. 6 is a schematic circuit diagram of an optical communication circuit of the second embodiment.

FIG. 6 is a schematic circuit diagram of the second embodiment showing the optical communication circuit 8' including the intensity control circuit 29.

The optical communication circuit 8' comprises a PNP transistor Tr1, a photodiode PD, an NPN transistor Tr2, and resistors R1 and R2. The PNP transistor Tr1 has an emitter connected to a supply power VDD, a base supplied with a signal S1, and a collector. The photodiode PD has an anode connected to the collector of the PNP transistor Tr1 and a cathode connected to the ground through the resistor R1 and to a collector of the NPN transistor Tr2 through the resistor R2. The base of the NPN transistor Tr2 is supplied with a signal S2 and the emitter of the NPN transistor Tr2 is connected to the ground.

In response to the signal S1, the PNP transistor Tr1 turns on the photodiode PD and in response to the signal S2, the NPN transistor Tr2 increases the current flowing through the photodiode PD, so that the intensity of the infrared light emitted by the photodiode PD increases.

Figure 7:
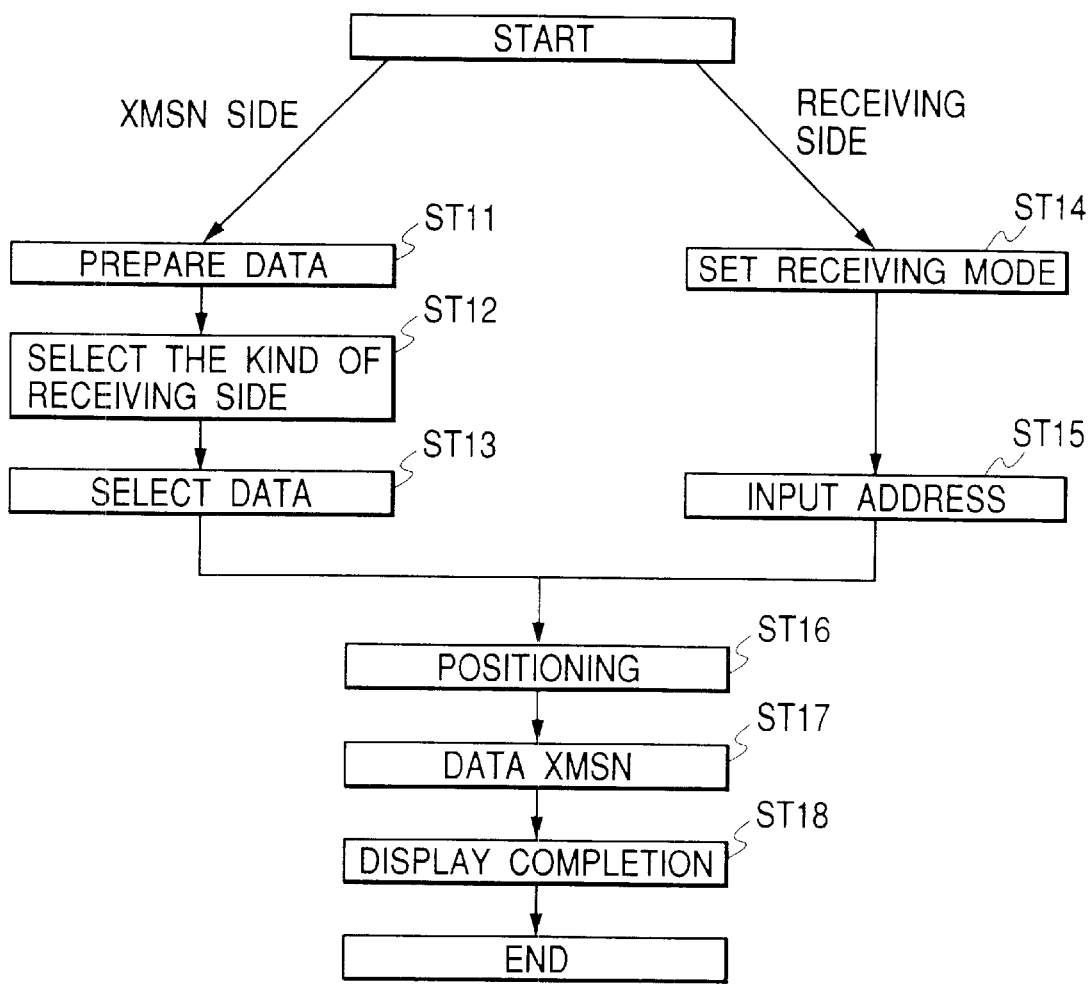
FIG. 7 depicts a flow chart of the second embodiment showing an operation by the user and the pagers.

FIG. 7 depicts a flow chart of the second embodiment showing an operation by the user and the pagers.

An operation of transmitting data from the pager C to the pager D will be described, assuming that the user prepares the telephone number data by operating switches 23 included in the operation circuit 10, for example.

In step st11, at first, the user prepares the telephone number data by operating the switches of the operation circuit 10 on the transmitting side of the pager C under the control of the data generation program 56 and stores the generated telephone number data in the memory 9 at the address indicated by the user using the input circuit 10.

Figure 12:
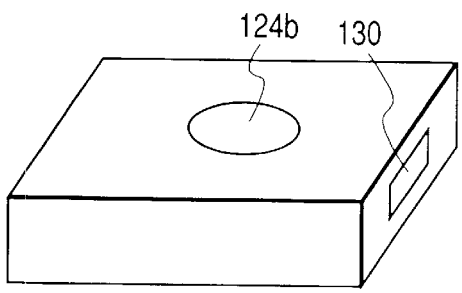
FIG. 12 is a perspective view of a prior art data input/output apparatus capable of communicating with the prior art pager shown in FIG. 11 with the optical communication function.

In step st12, the user selects the kind of the receiving side, that is, the user selects either of the pager D or the input/output apparatus such as the prior art input/output apparatus shown in FIG. 12. In this example, the user selects the pager D. In response to this, the control program 5 supplies the signal S2 to the optical communication circuit 8' to turn on the NPN transistor Tr2 to increase the infrared light to a high level.

In step st13, the user selects the data in the memory 9 to be transmitted by operating the input circuit 10, that is, for example, the user selects the telephone number list data at the eighth address.

In step st14, the user sets the pager D of the receiving side to the receiving mode.

In step st15, the user inputs the address of the data to be stored. For example, the user inputs "telephone number list data, the tenth address".

In step st16, as shown in FIG. 2 the user positions the pager B such that the window 24 of the pager C faces and contacts the window 24 of the pager D.

In step st17, the user operates one of the switches 23 of the pager C to emit the infrared light. In response to this, the communication judging program 28 of the pager D judges whether it is possible to communicate with the pager C. If the communication judging program 28 judges it is possible, the communication judging program 28 informs the user of the possibility by sounding a melody. In response to this, the user operates the pager C to start transmission. Then, the pager C transmits the identification code 17 and the data 18 with the format 16 to the pager D. The transmission data is optically transmitted through the start-stop transmission method at a data rate of 2400 bps.

During the step st17, the data transmission control program 11 reads the data stored at the storing area 54 for storing the inputted telephone number list data at the eighth address in accordance with the operation to the input circuit 10. The data attaching program 14a generates the identification code 17 including the kind data "10" and address "111" and attaches the identification code 17 to the data 18 of the telephone number list data to generate transmission data having the data format 16. The transmission data is supplied to the optical communication circuit 8' as the signal S1. The optical communication circuit 8' of the pager C converts the transmission data into the optical signal of infrared light and emits the optical signal toward the pager D through the window 24 of the pager C. The pager D receives the optical signal from the pager C and converts it into the electrical signal as reception data by the optical communication circuit 8' of the pager C. The data judging program 15 reads the identification code 16 from the reception data and judges the identification code 17. The storing control program 12 stores the data 18 in the reception data at the storing area 54 at the tenth address of the pager D.

In step st18, when transmission of the data has completed, the timing control programs 13 in the pagers C and D stops the operation in the optical communication circuits 8' and displays "completion" on the LCDs 25 of the pagers C and D.

Modifications will be described.

In this embodiment, in step st12, the user selects the kind of the receiving side. However, it is also possible that in response to power-on of the pager C, the control program 5 sets the condition of the signal S2 to emit rather weak infrared light That is, it is assumed that the power-on condition is for communicating with the input/output apparatus. Accordingly, the selection of kind of the receiving side can be omitted.

Third Embodiment

Figure 8:
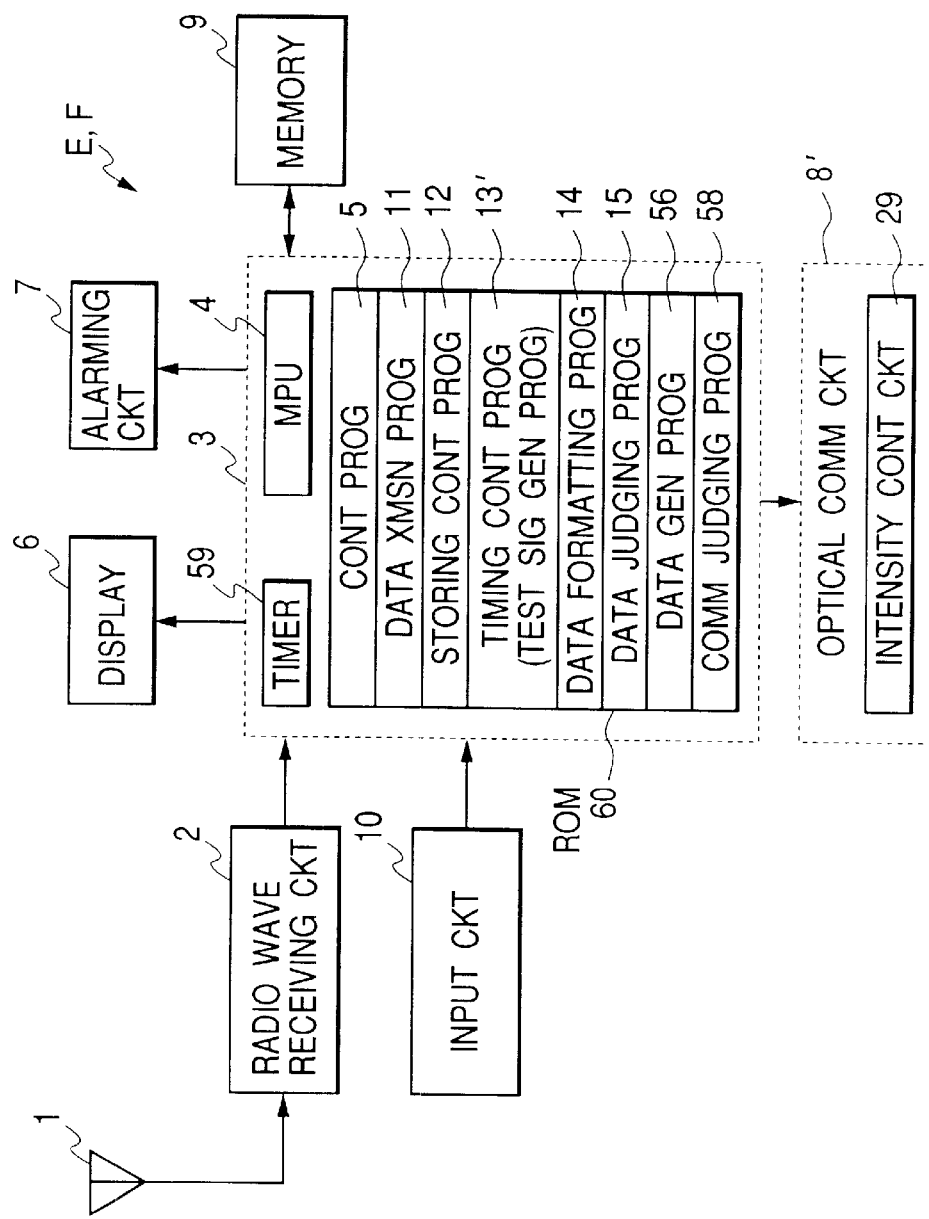
FIG. 8 is a block diagram of a pager of a third embodiment.

FIG. 8 is a block diagram of a pager of a third embodiment.

The pager of the third embodiment is substantially the same as that of the second embodiment. The difference is that the timing control program 13' replaces the timing control program 13 and a timer 59 is further provided to the control circuit 3.

Figure 9:
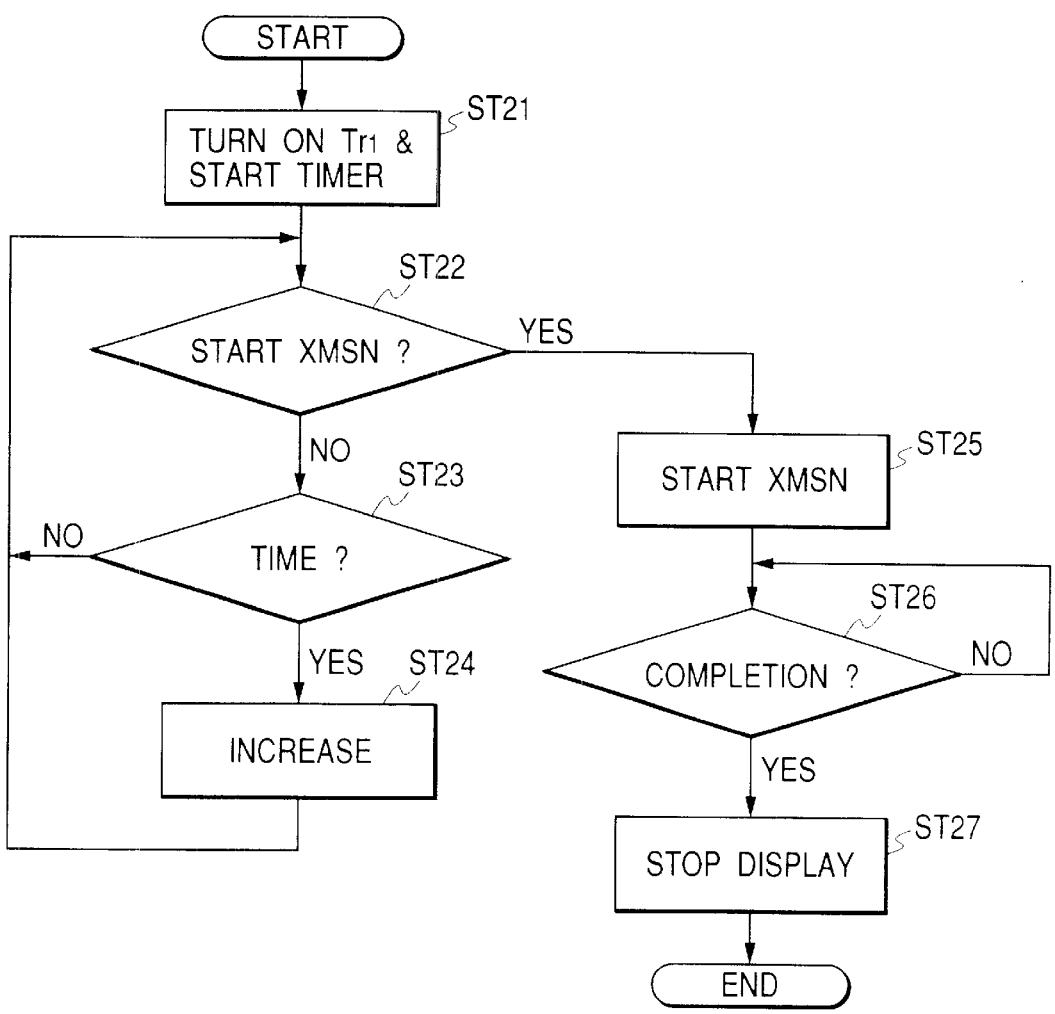
FIG. 9 depicts a flow chart of the timing control program of the third embodiment.
Figure 10:
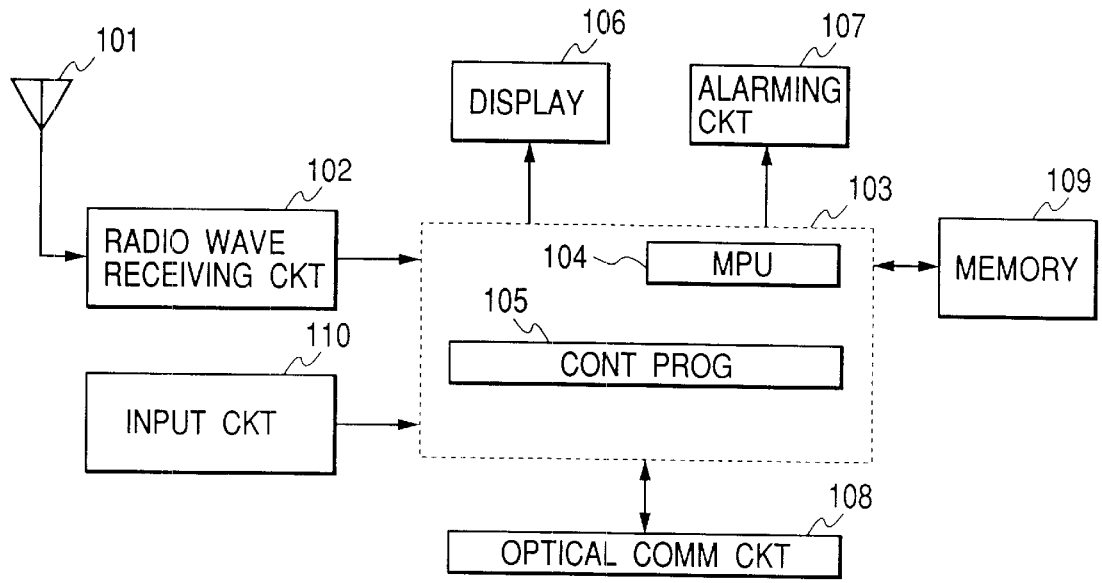
FIG. 10 is a block diagram of a prior art pager.
Figure 11:
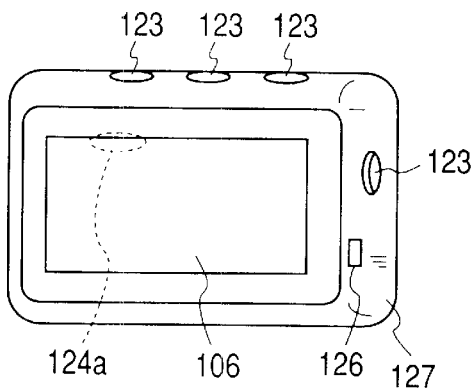
FIG. 11 is a perspective view of the prior art pager shown in FIG. 10.

FIG. 9 depicts a flow chart of the timing control program of the third embodiment.

In this embodiment, the timing control program 13' executes the timing controlling as shown in FIG. 9., In step st2l, the timing control program (MPU4) turns on the PNP transistor Tr1 to emit a test light signal and start the timer 59. In the following step st22, it is judged whether there is a start command of the data transmission. If there is no start command of the data transmission, it is judged whether a predetermined interval has passed in step st23 with the timer 59. If the predetermined interval has not passed, processing returns to step st22 to wait for the start command of the data transmission. In step st22, if there is the start command of the data transmission within the predetermined interval, the timing control program 13' starts transmitting transmission data in step st25. When the transmission has completed in step st26, the timing control program 13' stops the operation of the optical communication circuit 8' and displays "completion" on the display 6.

In step st23, if the predetermined interval has passed, a timing control program 13' increases the intensity of the infrared light by controlling the signal S2. That is, if there is no start command of the data transmission to the pager of the transmission side after emitting the infrared light for judging whether communication between the pagers is possible within the predetermined interval, the timing control program 13' increases the intensity of the infrared light emitted by the photodiode D. This is because if the user is informed of possibility of communication from the pager of the receiving side, the pager of the transmission side will receive the start command of transmission within the predetermined interval.

As mentioned in the pager according to this invention, if it is possible to have communication between the pagers, the user is informed that the optical communication is possible, so that the user can obtain the optical communication between both pages. If the user is not informed that the optical communication is possible, the user can check the alignment of both pagers, and the pager of the transmission side increases the intensity of the infrared light to a high level.

What is claimed is:

1. A wireless terminal device comprising:

radio wave receiving means for receiving a radio wave signal including message data and address data;

storing means;

message receiving means for receiving said message data from the received radio wave signal and storing the received message data in said storing means when said address data indicates said wireless terminal device;

data generation means responsive to an operation for generating data and storing said generated data in said storing means;

optical communication means for converting transmission data into a first optical signal and directly transmitting said first optical signal to another wireless terminal device and for directly receiving a second optical signal including second data from said other of wireless terminal device and converting said second optical signal into received data;

transmission control means for reading either of said message data or said generated data from said storing means in accordance with a data selection command as said transmission data and transmitting said transmission data through said optical communication means in response to a user-entered transmission command setting said wireless terminal device into a user-initiated transmission mode; and receiving control means for storing said received data in said storing means in response to a user entered receiving command setting said wireless terminal device into a user-initiated receiving mode; and identification code generation means for generating a first identification code in accordance with said data selection command;

data attaching means for attaching said identification code to said transmission data, said transmitting means transmitting said transmission data and said identification code, wherein said received data includes a second identification code; and detection means for detecting said second identification code from said received data, said receiving means storing said received data in said storing means at one of storing areas in accordance with the detected second identification code.

2. A wireless terminal device comprising:

radio wave receiving means for receiving a radio wave signal including message data and address data;

storing means;

message receiving means for receiving said message data from the received radio wave signal and storing the received message data in said storing means when said address data indicates said wireless terminal device;

data generation means responsive to an operation for generating data and storing said generated data in said storing means;

optical communication means for converting transmission data into a first optical signal and directly transmitting said first optical signal to another wireless terminal device and for directly receiving a second optical signal including second data from said other of wireless terminal device and converting said second optical signal into received data;

transmission control means for reading either of said message data or said generated data from said storing means in accordance with a data selection command as said transmission data and transmitting said transmission data through said optical communication means in response to a user-entered transmission command setting said wireless terminal device into a user-initiated transmission mode; and receiving control means for storing said received data in said storing means in response to a user entered receiving command setting said wireless terminal device into a user-initiated receiving mode; and light intensity changing means for changing an intensity of said first optical signal in accordance with an intensity changing command signal.

3. A wireless terminal device comprising:

radio wave receiving means for receiving a radio wave signal including message data and address data;

storing means;

message receiving means for receiving said message data from the received radio wave signal and storing the received message data in said storing means when said address data indicates said wireless terminal device;

data generation means responsive to an operation for generating data and storing said generated data in said storing means;

optical communication means for converting transmission data into a first optical signal and directly transmitting said first optical signal to another wireless terminal device and for directly receiving a second optical signal including second data from said other of wireless terminal device and converting said second optical signal into received data;

transmission control means for reading either of said message data or said generated data from said storing means in accordance with a data selection command as said transmission data and transmitting said transmission data through said optical communication means in response to a user-entered transmission command setting said wireless terminal device into a user-initiated transmission mode; and receiving control means for storing said received data in said storing means in response to a user entered receiving command setting said wireless terminal device into a user-initiated receiving mode; and judging means for judging whether it is possible to communicate with another wireless terminal device from said received data; and informing means for informing a user of the judging result from said judging means with a melody when said judging means judges it is possible to communicate with another wireless terminal device.

4. The wireless terminal device as claimed in claim 2, wherein said optical communication means comprises test signal generation means for generating a test signal in response to a test signal command and timer means, said transmitting means operating said optical communication means to increase said intensity of light when said transmitting means does not receive said transmission command within a predetermined interval measured by said timer.

5. A method of communication between wireless terminal devices comprising the steps of:

receiving a radio wave signal including message data and address data;

providing a memory;

receiving said message data from the received radio wave signal and storing the received message data in said memory when said address data indicates said wireless terminal device;

generating data and storing said generated data in said memory in response to an operation;

converting input data into a first optical signal and directly transmitting said first optical signal to another wireless terminal device;

directly receiving a second optical signal including second data from said another wireless terminal device;

converting said second optical signal into received data;

reading either of said message data or said generated data from said memory in accordance with a data selection command indicative of either of said message data or said generated data as transmission data;

transmitting said transmission data as said first optical signal in response to a user entered transmission command setting said wireless terminal device into a user-initiated transmission mode;

storing said received data in said memory in response to a user-entered receiving command setting said wireless terminal device in a user-initiated receiving mode;

generating a first identification code in accordance with said data selection command;

attaching said first identification code to said transmission data;

transmitting said transmission data and said first identification code, wherein said received data includes a second identification code;

detecting said second identification code from said received data; and storing said received data in said memory at one of storing areas in accordance with the detected second identification code.

6. A method of communication between wireless terminal devices comprising the steps of:

receiving a radio wave signal including message. data and address data;

providing a memory;

receiving said message data from the received radio wave signal and storing the received message data in said memory when said address data indicates said wireless terminal device;

generating data and storing said generated data in said memory in response to an operation;

converting input data into a first optical signal and directly transmitting said first optical signal to another wireless terminal device;

directly receiving a second optical signal including second data from said another wireless terminal device;

converting said second optical signal into received data;

reading either of said message data or said generated data from said memory in accordance with a data selection command indicative of either of said message data or said generated data as transmission data;

transmitting said transmission data as said first optical signal in response to a user entered transmission command setting said wireless terminal device into a user-initiated transmission mode;

storing said received data in said memory in response to a user-entered receiving command setting said wireless terminal device in a user-initiated receiving mode; and changing an intensity of said first optical signal in accordance with an intensity changing command signal.

7. A method of communication between wireless terminal devices, comprising the steps of:

receiving a radio wave signal including message data and address data;

providing a memory;

receiving said message data from the received radio wave signal and storing the received message data in said memory when said address data indicates said wireless terminal device;

generating data and storing said generated data in said memory in response to an operation;

converting input data into a first optical signal and directly transmitting said first optical signal to another wireless terminal device;

directly receiving a second optical signal including second data from said other wireless terminal device;

converting said second optical signal into received data;

reading either of said message data or said generated data from said memory in accordance with a data selection command indicative of either of said message data or said generated data as transmission data;

transmitting said transmission data as said first optical signal in response to a user-entered transmission command setting said wireless terminal device into a user-initiated transmission mode;

storing said received data in said memory in response to a user-entered receiving command setting said wireless terminal device in a user-initiated receiving mode;

judging whether it is possible to communicate with another wireless terminal device from said received data; and informing a user of the judging result with a melody when said judging means judges it is possible to communicate with another wireless terminal device.

* * * * *